United States Patent [19]

Heidelberg et al.

[11] Patent Number: 5,200,660
[45] Date of Patent: Apr. 6, 1993

[54] ELECTRIC MACHINE

[76] Inventors: Götz Heidelberg, Am Hügel 16, D-8136 Starnberg-Percha; Andreas Gründl, Haseneystrasse 20; Peter Ehrhart, Saalburgstrasse 24a, both of D-8000 München, all of Fed. Rep. of Germany

[21] Appl. No.: 915,409

[22] Filed: Jul. 20, 1992

Related U.S. Application Data

[63] Continuation of Ser. No. 623,381, Nov. 16, 1990, abandoned, filed as PCT/EP89/00533 filed on May 16, 1989.

[30] Foreign Application Priority Data

May 16, 1988 [DE] Fed. Rep. of Germany ....... 3816651

[51] Int. Cl.$^5$ ..................... H02K 11/00; H02K 16/00; H02K 1/00; H02K 21/14
[52] U.S. Cl. .................................. 310/114; 310/181; 310/190; 310/191; 310/209; 310/68 R
[58] Field of Search ..................... 310/68 B, 112, 115, 310/116, 117, 118, 166, 168, 181, 190, 191, 209, 210, 68 R; 318/254, 685, 696

[56] References Cited

U.S. PATENT DOCUMENTS

| | | | |
|---|---|---|---|
| 3,411,027 | 11/1968 | Rosenberg | 310/181 |
| 3,743,873 | 7/1973 | de Jong | 310/114 |
| 4,110,649 | 8/1978 | Mas | 310/209 |
| 4,221,985 | 9/1980 | Larson et al. | 310/171 |
| 4,241,270 | 12/1980 | Haydon et al. | 310/164 |
| 4,305,031 | 12/1981 | Wharton | 310/114 |
| 4,329,606 | 5/1982 | Montagu | 310/112 |
| 4,371,801 | 2/1983 | Richter | 310/191 |
| 4,375,047 | 2/1983 | Nelson et al. | 310/112 |
| 4,578,609 | 3/1986 | McCarty | 310/191 |
| 4,629,948 | 12/1986 | Tassinario | 310/113 |
| 4,654,551 | 3/1987 | Farr | 310/181 |
| 4,656,379 | 4/1987 | McCarty | 310/181 |
| 4,972,112 | 11/1990 | Kim | 310/181 |
| 4,980,595 | 12/1990 | Arora | 310/208 |

FOREIGN PATENT DOCUMENTS

| | | |
|---|---|---|
| 0058025 | 8/1982 | European Pat. Off. . |
| 162204 | 7/1904 | Fed. Rep. of Germany . |
| 183323 | 7/1905 | Fed. Rep. of Germany . |
| 708038 | 6/1941 | Fed. Rep. of Germany . |
| 1181796 | 11/1964 | Fed. Rep. of Germany . |
| 2319184 | 10/1974 | Fed. Rep. of Germany . |
| 3317553 | 11/1984 | Fed. Rep. of Germany . |
| 3427103 | 1/1986 | Fed. Rep. of Germany . |
| 1556211 | 12/1968 | France . |
| 61-231857 | 10/1986 | Japan . |
| 2056725 | 3/1981 | United Kingdom . |

OTHER PUBLICATIONS

Köster et al., "Eigenschaften und Anwendung von Kleinst-Synchronmotoren und Schrittmotoren," VALVO BERICHTE BAND X HEFT ½, Apr. 1964, pp. 277–284.

Primary Examiner—Steven L. Stephan
Assistant Examiner—Clayton E. La Balle
Attorney, Agent, or Firm—Spencer, Frank & Schneider

[57] ABSTRACT

An electric machine includes an armature which has a permanent-magnetic excitation part of the machine and a stator which has an induction part of the machine. The induction part includes a first and a second region, each region equipped with current conductors. The armature and the stator are movable relative to each other. The machine includes an electronic commutator which has electronic components. An adjustment to purposefully change a voltage induced in the induction part during operation of the machine, by adjustment of the relative phase of the voltages induced in the two regions of the induction part is achievable due to the first region of the induction part being physically adjustable relative to the second region of the induction part in the direction of relative movement of the armature and the stator. In addition, a sensor is provided in the second region for detecting the instantaneous relative position of the armature and the stator.

21 Claims, 1 Drawing Sheet

ELECTRIC MACHINE

This application is a continuation of application Ser. No. 07/623,381 on Nov. 16, 1990, now abandoned, filed as PCT/EP89/00533 filed May 16, 1989.

BACKGROUND OF THE INVENTION

The invention relates to an electric machine comprising a permanent-magnetic excitation part and an induction part equipped with permanent magnets, said parts being movable relative to each other and said machine being in particular an electric machine commutated by means of electronic components.

Such electric machines, which are known, can be envisaged most easily with the aid of the comparative picture of a mechanically or electronically commutated d.c. motor with permanent-magnetic excitation, although the machine according to the invention by no means has to completely or largely correspond to this comparative picture. Conventional machines of this type have an M-n-characteristic (M meaning torque and n meaning speed of rotation) which, at least from a specific rotational speed range, decreases in pronounced manner as the rotational speed increases. The main cause thereof is that, as the rotational speed increases, the electromotive force (e.m.f.) induced in the machine increases and, consequently, only a lower current can still be "pressed" into the machine against this e.m.f. The fundamental correlation outlined holds also for electronically commutated machines in which the electronic commutation indeed can be controlled such that the current flowing through the machine is held approx. at the same level until a specific rotational speed range is reached; however, above this rotational speed range the machine current then decreases rapidly.

SUMMARY OF THE INVENTION

It is the object of the invention to make available an electric machine providing controllability of the amount of the torque output, which is at least to a large extent independent of the conventional dependency on the rotational speed.

To meet this object, the machine according to the invention is characterized in that, for purposefully changing the e.m.f. induced in the induction part while the machine is in operation, a means is provided that is adapted to adjust the phase relation of the voltages induced in two partial regions of the induction part and/or a means is provided that is adapted to adjust the amount of the effective permanent-magnetic flux in the machine.

If desired, the invention can be used in particular for achieving that the power $P = M \times n$ of the machine—at least from a specific range of the rotational speed—remains constant with respect to the rotational speed at least in essence. Furthermore, it is possible in particular to achieve the effect that the torque decreases greatly only at a higher speed of rotation, so that higher speeds of rotation can be utilized.

Thus, in case of the solution alternative mentioned first, the amount or quantity of the e.m.f. induced while the machine is in operation is influenced, and in particular a reduction of the e.m.f. is adjusted at increasing rotational speed, so that a higher current can be commutated in this machine than without this measure. The solution alternative mentioned in the second place has in analogous manner the effect of an adjustment of the induced e.m.f. since the amount of the induced e.m.f. is directly dependent on the magnetic flux flowing due to the permanent magnets; a higher permanent-magnetic flux means—provided that the rotational speed remains the same—higher e.m.f. and vice versa. The adjective "effective" was added in order to point out that those magnetic fluxes originating from the permanent magnets are of importance which are each prevailing in the region of the current conductors or coils; as regards individual locations of the magnetic circuits, for instance on the permanent magnets themselves, there may be greater magnetic fluxes present.

It is pointed out that the electric machine according to the invention need not necessarily be a motor consuming electrical power and outputting mechanical power, but may also be a generator consuming mechanical power and outputting electrical power. In case of a generator, it is possible to control the mechanical power consumed by the generator at a specific rotational speed by control of the electrical power output.

Furthermore, it is pointed out that the electric machine according to the invention need not be a rotary machine, but may also be a linear machine. The more concrete possible embodiments of the invention described hereinafter can be realized both with rotary motors or generators, respectively, and in analogous manner also with linear motors or generators, respectively. Finally, it is pointed out that in the electric machine according to the invention optionally either the induction part can be associated with the stator and the excitation part can be associated with the rotor, or vice versa. A further feasible possibility is that both the induction part and the excitation part are moving, however at a relative speed. However, in most cases it will be more expedient to associate the induction part equipped with current conductors with the stator of the machine, since in that case the current supply and respectively—in case of a generator—the current removal can be effected in simpler manner. The rotor of the machine may be a so-called internal rotor which is annularly surrounded by the stator. However, the rotor may also be a so-called external rotor which is of annular configuration and surrounds the stator radially on the outside thereof. Finally, it is possible that the rotor is disposed axially beside the stator, i.e. such that the so-called active area of the machine is located in a plane extending at right angles to the axis of rotation and is not of cylindrical configuration as in case of the constructional types described before.

It is apparent that the excitation part and the induction part are located opposite each other with an air gap being left free therebetween.

Preferably, highly coercive permanent magnets, for instance on the basis of rare earths with cobalt or iron, such as Sm-Co-magnets or Fe-Nd-magnets, are utilized.

Most preferred are embodiments of the electric machine according to the invention as rotary motors, preferably with external rotor and/or with electronic commutation.

Particularly simple embodiments of the machine according to the invention, which are preferred as further developments of the invention, are characterized in that two partial regions of the induction part and/or of the excitation part, with two partial regions of the induction part being still provided, are physically adjustable relative to each other in the direction of relative movement of excitation part and induction part, with these partial regions being preferably arranged beside one another transversely to the direction of relative movement. In case of rotary machines, this results in a rotatability of the two partial regions relative to each other about the axis of rotation of the machine. There is an adjustable phase difference between the two parts of the total e.m.f. A sign-considering addition of the two partial e.m.f. values results at all times in a total e.m.f. which—except for non-shifted induction parts—is lower than the e.m.f. without the outlined subdivision of the induction part and/or the excitation part, since the peak values of the partial e.m.f. do not coincide in terms of time.

A change in the phase relation between the two partial regions of the induction part can be adjusted, as is preferred furthermore, in electrical manner by means of a phase shifter, with L.C. members being quoted as simplest example thereof.

For purposefully changing the amount of quantity of the effective permanent-magnetic flux in the machine, the following simple possibilities are particularly preferred:

The excitation part and the induction part, each either as a whole or with respect to a constituent part, are physically adjustable relative to each other transversely to the direction of relative movement of excitation part and induction part. A pole head constituent part of the induction part is physically adjustable relative to the remainder of the induction part in the direction of relative movement of excitation part and induction part. A constituent part of the excitation part, which generates permanent-magnetic flux or carries permanent-magnetic flux, is physically adjustable relative to the remainder of the excitation part in the direction of relative movement of excitation part and induction part. In case of rotary machines, the first-mentioned possibility results in an axial relative adjustment of excitation part and induction part and, respectively, of constituent parts of excitation part and induction part. The possibilities mentioned in the second and third places, in case of rotary machines, result in rotation of a constituent part of the induction part relative to the remainder to the induction part and, respectively, in rotation of a constituent part of the excitation part relative to the remainder of the excitation part. Due to such adjustments, the flux conditions for the magnetic fluxes originating from the permanent magnets are either improved or deteriorated in that an optimum flux path through magnetically conductive material is offered either to the entire or to a larger or smaller part of the magnetic flux, while considerably deteriorated or virtually interrupted flux conditions are present for the remainder of the magnetic flux. However, it is also possible to provide short circuit paths for the magnetic flux, with the result that a lower magnetic flux flows through the current conductor or coil regions. The resulting reduction in the effective permanent-magnetic flux, which has its effect in the region of the current conductors or current coils, leads to a reduction of the e.m.f. induced in the machine. In another type of adjustment (adjustable excitation partial regions disposed axially beside one another, only one induction part), the effective permanent-magnetic flux through the current coils is lowered and the e.m.f. is decreased.

A further preferred possibility of reducing and/or increasing the magnetic flux in the excitation part consists in providing auxiliary windings in the excitation part by means of which the magnetic flux originating from the permanent magnets can be reduced or increased.

However, it is also possible to influence the magnetic fluxes delivered from the permanent magnets, by acting on the magnetization thereof in the sense of increasing and/or decreasing the same. Preferred examples hereof are current conductors or electromagnets of sufficient field strength, or temperature changing means which are adapted to increasingly magnetize or partially demagnetize part of the permanent magnets or all of the permanent magnets of the excitation part.

According to a further, preferred possible embodiment the excitation part is provided with one or several auxiliary windings through which the return path of the permanent magnets can be magnetized transversely to the direction of magnetic flux. In this manner the magnetic-flux return path can be partly or completely premagnetized transversely to the direction of magnetic flux, so that said path reaches the saturation state earlier or is in this saturation state from the very beginning. A return path portion which is in the saturation state acts like an additional air gap at this location, so that the effective magnetic flux which, with the participation of this portion with deteriorated flux conditions, passes through the associated region of the induction part is reduced.

As regards the statement made hereinbefore that a first and a second partial region of the induction part and the excitation part, respectively, are rotatable relative to each other, this is to be understood in the sense that the machine on the whole may also have more than two partial regions, for instance two non-adjustable partial regions and a central adjustable partial region. If desired, the aforedescribed adjustments or flux changes, respectively, can also be effected automatically, as a function of the rotational speed of the machine, with concrete reference in this respect being made to the possibility of an automatic adjustment due to centrifugal force. However, in most cases it will be preferred to effect these adjustments or changes by purposeful control acts and not in purely automatic manner. Furthermore, it is pointed out that a number of embodiments of the invention permit an adjustment of the torque and the total e.m.f., respectively, to zero. This can be envisaged in particularly clear manner in embodiments of rotary machines in which a first and a second partial region of the induction part and/or the excitation part are rotatable relative to each other. When the second partial region is rotated with respect to the first partial region by a permanent-magnet pole center-to-center spacing, an e.m.f. is induced in a first direction in one part of the machine, and an e.m.f. of the same intensity is induced in the opposite direction in another part of the machine, provided that the machine parts have the same size.

In part of the embodiments of the invention, in particular in those employing a relative adjustment of first and second partial regions of induction part and/or excitation part, the design is most expediently chosen such that mutually associated coil pairs in the induction part are connected in series, so that the electromotive forces induced in these coils add up in sign-considering manner. Furthermore, care should expediently be taken that the moments of time of the current commutation in the current conductors of the induction part are matched with the adjustment situation, since the zero passage of the total e.m.f., because of the addition, is located at a different moment of time than prior to the adjustment.

Electric motors with electronic commutation are known per se, so that further details in this respect need not be described specifically. As an example hereof, reference is made to EP-PS 94 978.

The machine according to the invention preferably is in the form of a multiple construction. This means that the machine, especially with respect to the coils of the induction part and/or with respect to the converters for the electronic commutation and/or with respect to the sensors for the electronic commutation, is of modular construction with a plurality of mutually alike large-series parts. A multiple construction can also be realized in that self-supporting partial combinations of coils, converters and sensors are operable per se, i.e. that the machine so-to-speak is composed of a plurality of self-supporting partial machines. Failure of individual partial machines then does not entail the failure of the machine as a whole.

BRIEF DESCRIPTION OF THE DRAWINGS

The invention and further developments of the inventions will be elucidated in more detail hereinafter by way of preferred embodiments schematically shown in the drawings in which.

DETAILED DESCRIPTION OF THE PREFERRED EMBODIMENT(S)

Figure 1:
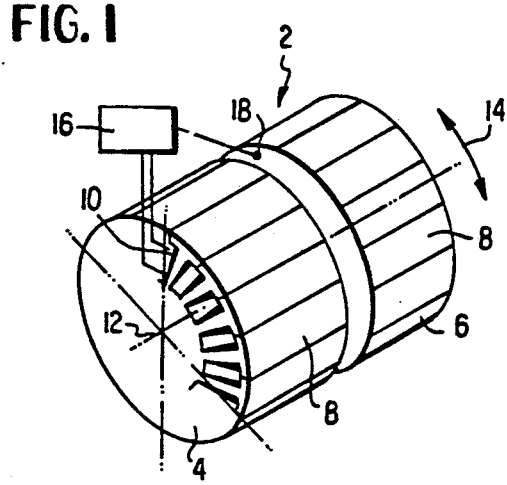
FIG. 1 shows a perspective view of the induction part of a rotary machine, which consists of two partial regions.

The substantially cylindrical induction part 2, shown in FIG. 1, of an electric machine (motor or generator) consists of two axially adjacent partial regions 4, 6. Each partial region 4, 6 comprises in circumferentially distributed manner twenty poles 8 each provided with a coil 10. The two partial regions 4, 6 are at least essentially of like structure.

Disposed concentrically around the illustrated induction part is a hollow cylindrical excitation part which is not shown in the drawing and is provided on its inner circumference with circumferentially distributed permanent magnets of alternating polarization. The excitation part is not subdivided into two mutually rotatable partial regions. The excitation part is supported so as to be rotatable about the longitudinal central axis 12 of the induction part 2.

The, with respect to FIG. 1, rear partial region 6 of the induction part 2 is rotatable relative to the other partial region 4 in one or both directions by mechanical, hydraulic, pneumatic or electric means, as indicated by arrow 14, in an extent corresponding to the circumferential length of one pole 8. In case those two coils 10 which are axially aligned with each other in the zero position of the partial region 6, i.e. when the partial region 6 is not rotated with respect to the stationary partial region 4, are electrically connected in series with each other.

16 designates an electronic commutation means. The commutation means 16 constantly receives, via a sensor 18 arranged on the induction part, information on the instantaneous rotational relative position of excitation part and induction part 4. Due to this information the coils 10 of the induction part 4 are each commutated or reversed in their polarity at the time appropriate for the torque generation. The commutation means 16 may switch individual ones, several ones or also all coils 10 of the machine. When the illustrated commutation means 16 does not switch all coils 10, several commutation means 16 must be provided.

When the two partial regions 4, 6 are rotated with respect to each other, corresponding to the condition shown in the drawing, the e.m.f. induced in partial region 6 is offset in time with respect to the e.m.f. induced in partial region 4. Due to the series connection of coils 10 that are axially associated with each other, a sign-considering addition of the two partial electromotive forces takes place at all times. The peak values of the total e.m.f. are lower than the sum of the e.m.f. of the two partial regions 4, 6 in the zero condition.

When the partial region 6 is rotated by one full pole length on the circumference in one direction, no torque and no e.m.f. will be produced.

Figure 2:
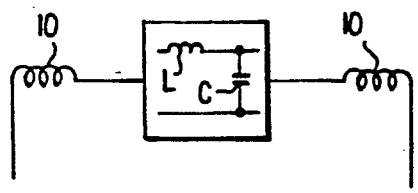
FIG. 2 shows a basic presentation of the electric phase shift between two coils of the induction part of the machine.

FIG. 2 illustrates the possibility of replacing the mechanical rotation of the partial regions 4, 6 by a purely electrical, adjustable phase shifting operation. Mutually axially aligned coils 10 of the induction part 2 are connected to each other by an adjustable L.C. member.

Figure 3:
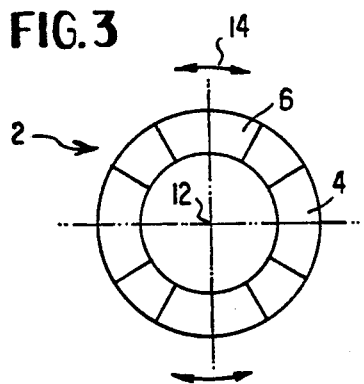
FIG. 3 shows a cross-sectional view of the induction part of a rotary machine, comprising two partial regions.

The embodiment according to FIG. 3 differs from the embodiment according to FIG. 1 in that the induction part is not subdivided into two axially adjacent partial regions 4, 6 but—in circumferentially alternating manner—into stationary partial regions 4 and partial regions 6 which are shown in dotted manner and are rotatable relative to the latter about the axis 12, cf. arrow 14. The coil(s) 10 of the particular rotatable partial region 6 is (are) connected in series with the coil or coils, respectively, of an associated stationary partial region 4 which, when the partial regions 6 are not rotated, has an analogous relative position with respect to the rotary excitation part 22, not shown, which concentrically surrounds the latter. The effects of the rotation are in principle analogous with those outlined hereinbefore.

Figure 4:
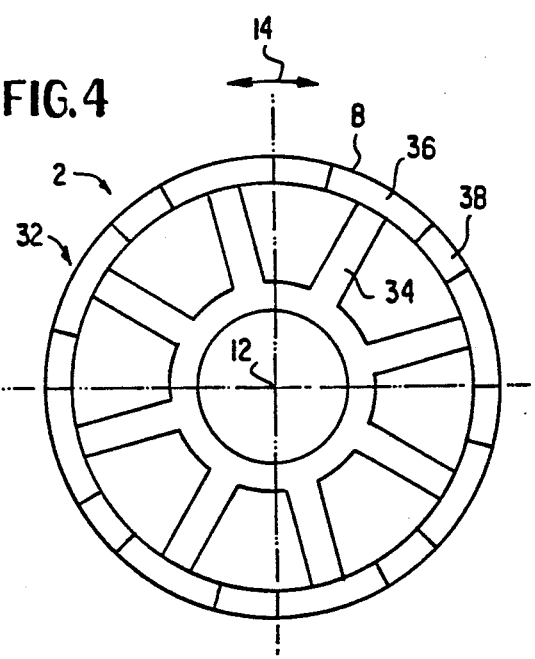
FIG. 4 shows a cross-sectional view of the induction part of a rotary machine, comprising a rotatable pole head ring.
Figure 6:
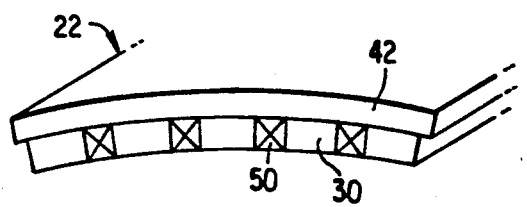
FIG. 6 shows a fragmentary perspective view of the excitation part of a rotary machine, comprising an auxiliary winding for changing the magnetization of the permanent magnets.

In the embodiment of FIG. 4, the illustrated induction part 2 comprises a pole head ring 32 rotatable relative to the remainder of the induction part 2 coaxially about the axis 12. The induction part 2 illustrates iron cores 34 of the coils 10, however, the coils 10 proper have been omitted for reasons of clarity. The pole head ring 32 is composed—in circumferentially alternating manner—of iron regions 36, shown in dotted manner, and of magnetically non-conducting regions 38, for instance of fiber-reinforced plastics material. FIG. 6 illustrates the zero position in which at each pole 8, an iron region 36 is disposed radially outside on a coil core 34 in symmetrical manner. Upon rotation of the pole head ring 32 from the illustrated zero position, the flux conditions for the permanent-magnetic flux in the coil cores 34 deteriorate, said flux flowing from magnetic flux circuits from the concentrically surrounding excitation part 22, not shown, through two coil cores 34 and back to the excitation part 22. The flux conditions deteriorate particularly greatly when the face areas of the coil cores 34 are no longer covered completely by iron regions 36 or when these face portions even are still covered only by the magnetically non-conducting regions 38.

Figure 5:
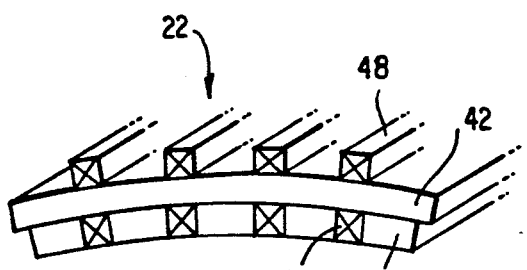
FIG. 5 shows a fragmentary perspective view of the excitation part of a rotary machine, comprising an auxiliary winding for influencing the permanent-magnetic flux.

In the embodiment of FIG. 5, an auxiliary winding coil 48 is associated with the particular return path extending through the return path ring 42 between two respective circumferentially adjacent permanent magnets 30 shown in dotted manner. By means of the particular auxiliary winding coil 48, the magnetic flux in the particular magnetic circuit can be reduced or increased, depending on whether a positive or a negative electromagnetic flux is superimposed on the flux originating from the permanent magnets 30.

The embodiment according to FIG. 6 comprises current conductors 50 in the distance spaces between the circumferentially spaced permanent magnets 30 shown in dotted manner. The current conductors 50 can be acted upon impulsively with such high currents that the permanent magnets 30 are magnetized to a stronger extent or are partly demagnetized.

It is to be understood that the embodiments described can be composed in alternative manner with a stationary excitation part and a rotatable induction part. It is to be understood, furthermore, that the excitation part shown and described as being located radially outside, may in alternative manner also be arranged radially inside and surrounded by a radially outer induction part. Corresponding linear motors or generators are easily conceivable when the illustrated rotary embodiments are depicted in a developed view.

In the illustrated and described embodiments, the magnetic flux conditions were influenced in substantially uniform manner throughout the machine. However, it is possible to build variants in which such influencing is carried out only in part of the magnetic circuits.

We claim:

1. An electric machine comprising:
    an armature including a permanent-magnetic excitation part of the machine;
    a stator including an induction part of the machine, the induction part having a first and a second region, each region equipped with current conductors, the armature and the stator being movable relative to each other;
    commutating means for commutating the machine, the commutating means including electronic components;
    adjustment means for purposefully changing a voltage induced in the induction part during operation of the machine, by adjustment of the relative phase of the voltages induced in the two regions of the induction part;
    wherein the first region of the induction part is physically adjustable relative to the second region of the induction part in the direction of relative movement of the armature and the stator; and
    wherein a sensor is provided in the second region for detecting the instantaneous relative position of the armature and the stator.

2. A machine according to claim 1 wherein the first and second regions of the induction part are disposed beside one another transversely to the direction of relative movement of the armature and stator.

3. A machine according to claim 1, wherein the excitation part of the machine comprises highly coercive permanent magnets.

4. A machine according to claim 1, wherein the excitation part and the induction part of the machine are located opposite one another with a cylindrical air gap being left free therebetween.

5. An electric machine comprising:
    a permanent-magnetic excitation part and an induction part equipped with current conductors, said parts being movable relative to each other, said induction part including first and second regions having first and second coils, respectively; and
    said first and second coils being connected in series with electric phase shifter means for purposefully changing a total counter-voltage induced in the induction part while the machine is in operation, by adjustment of the relative phase of counter-voltages induced in the first and second regions of the induction part so that the counter voltages induced in the first and second regions are out of phase, whereby the total counter-voltage of the machine is smaller than the sum of the counter-voltages induced in the first and second regions.

6. A machine according to claim 5, further comprising commutating means for commutating the machine, the commutating means including electronic components.

7. A machine according to claim 5, wherein the excitation part comprises highly coercive permanent magnets.

8. A machine according to claim 5, wherein the excitation part and the induction part of the machine are located opposite one another with a cylindrical air gap being left free therebetween.

9. An electric machine comprising:
    a permanent-magnetic excitation part and an induction part equipped with current conductors and a pole head constituent portion facing the excitation part, said parts being movable relative to each other;
    wherein the pole head constituent portion of the induction part is one of physically rotatable relative to the remainder of the induction part and physically adjustable relative to the remainder of the induction part in a direction of movement relative to the excitation part, to thereby purposefully change a voltage induced in the induction part during machine operation, by adjustment of the amount of the effective permanent-magnetic flux in the machine.

10. An electric machine according to claim 9, wherein the pole head constituent part of the induction part is rotatable or adjustable to such an extent that face areas of the remainder of the induction part are covered by magnetically non-conducting portions.

11. A machine according to claim 9, further comprising commutating means for commutating the machine, the commutating means including electronic components.

12. A machine according to claim 9, wherein the excitation part comprises highly coercive permanent magnets.

13. A machine according to claim 9, wherein the excitation part and the induction part of the machine are located opposite one another with a cylindrical air gap being left free therebetween.

14. An electric machine comprising:

a permanent-magnetic excitation part and an induction part equipped with current conductors, said parts being movable relative to each other; and means in the excitation part, including auxiliary windings each arranged between two adjacent permanent magnets and associated with a flux path between the adjacent permanent magnets, for superimposing an electrically induced magnetic flux in order to reduce or increase the permanent-magnetic flux in the excitation part to thereby purposefully change a voltage induced in the induction part during machine operation, by a resulting adjustment of the amount of the effective permanent-magnetic flux in the machine.

15. A machine according to claim 14, further comprising commutating means for commutating the machine, the commutating means including electronic components.

16. A machine according to claim 14, wherein the excitation part comprises highly coercive permanent magnets.

17. A machine according to claim 14, wherein the excitation part and the induction part of the machine are located opposite one another with a cylindrical air gap being left free therebetween.

18. An electric machine comprising:

a permanent-magnetic excitation part including permanent magnets and an induction part equipped with current conductors, said parts being movable relative to each other; and adjustment means for increasing or decreasing the magnetic flux of the permanent magnets of the excitation part, said adjustment means including one of current conductors, electromagnets, and temperature changing means, said adjustment means thereby further magnetizing or partially demagnetizing the permanent magnets of the excitation part to purposefully change a voltage induced in the induction part during machine operation, by adjustment of the amount of the permanent-magnetic flux in the machine.

19. A machine according to claim 18, further comprising commutating mans for commutating the machine, the commutating means including electronic components.

20. A machine according to claim 18, wherein the excitation part comprises highly coercive permanent magnets.

21. A machine according to claim 18, wherein the excitation part and the induction part of the machine are located opposite one another with a cylindrical air gap being left free therebetween.

* * * * *